US009930744B2

(12) United States Patent
Sills et al.

(10) Patent No.: US 9,930,744 B2
(45) Date of Patent: Mar. 27, 2018

(54) INTEGRATED FISH DIVERSION SYSTEM, AND LIGHTING DEVICE USED THEREIN

(71) Applicant: ATET-TECH INC., Thornhill (CA)

(72) Inventors: Alexander Michael Sills, Thornhill (CA); Paul Henry Patrick, Milton (CA); Timothy Charlton Patrick, Toronto (CA)

(73) Assignees: Alexander Michael Sills, Thornhill, Ontario (CA); Paul Henry Patrick, Milton, Ontario (CA); Timothy Charlton Patrick, Toronto, Ontario (CA)

( * ) Notice: Subject to any disclaimer, the term of this patent is extended or adjusted under 35 U.S.C. 154(b) by 334 days.

(21) Appl. No.: 14/503,577

(22) Filed: Oct. 1, 2014

(65) Prior Publication Data

US 2015/0090189 A1    Apr. 2, 2015

(30) Foreign Application Priority Data

Oct. 1, 2013 (CA) ...................................... 2829276

(51) Int. Cl.
*A01K 61/00* (2017.01)
*H05B 33/08* (2006.01)
(Continued)

(52) U.S. Cl.
CPC ......... *H05B 33/0872* (2013.01); *A01K 79/02* (2013.01); *E02B 1/006* (2013.01)

(58) Field of Classification Search
CPC ...... A01K 61/00; A01K 61/001; A01K 75/02; A01K 79/02; A01K 63/06; A01K 63/04;
(Continued)

(56) References Cited

U.S. PATENT DOCUMENTS 2,826,897 A    3/1958 Vinsonhaler et al.
4,955,005 A    9/1990 Loeffelman
(Continued)

OTHER PUBLICATIONS

"Fish Protection at Water Diversions, a Guide for Planning and Designing Fish Exclusion Facilities," U.S. Department of the Interior Bureau of Reclamation, Denver, Colorado, 2006.
(Continued)

*Primary Examiner* — Trinh T Nguyen
(74) *Attorney, Agent, or Firm* — Merizzi, Ramsbottom and Forster (57) ABSTRACT

Described are various embodiments of an integrated fish diversion system, and lighting device used therein. One embodiment provides a system for diverting approaching fish from a predominant water flow path and toward a bypass. The system comprises a structural diversion assembly to be disposed across the predominant water flow path to guide the approaching fish along the structural diversion assembly to the bypass, while allowing passage of water through the structural diversion assembly along the predominant water flow path. The system further comprises one or more lighting devices to be cooperatively disposed in relation to the structural diversion assembly to further guide the approaching fish toward the bypass; and a controller operatively coupleable to the one or more lighting devices and operable to select an output spectrum thereof to optimize fish guidance thereby.

9 Claims, 9 Drawing Sheets

(51) Int. Cl.
  *A01K 79/02* (2006.01)
  *E02B 1/00* (2006.01)
(58) Field of Classification Search
  CPC .. A01K 61/002; A01K 61/005; A01K 61/006;
    A01M 29/10; E01B 5/085; E01B 1/006;
    E01B 8/085; E01B 8/08
  USPC ............ 119/219, 220, 215, 216, 174, 200;
    405/81, 80, 82, 83; 43/17, 17.1; 367/139
  See application file for complete search history.

(56) References Cited

U.S. PATENT DOCUMENTS

| | | | |
|---|---|---|---|
| 5,263,833 A | | 11/1993 | Robinson et al. |
| 5,850,806 A | * | 12/1998 | Mark ............... A01K 79/02 |
| | | | 119/219 |
| 5,937,791 A | | 8/1999 | Baugher et al. |
| 6,203,170 B1 | | 3/2001 | Patrick et al. |
| 6,347,908 B1 | | 2/2002 | Safwat |
| 6,357,389 B1 | * | 3/2002 | March ............... F03B 3/06 |
| | | | 119/219 |
| 6,712,555 B1 | | 3/2004 | Truebe et al. |
| 6,922,935 B2 | | 8/2005 | Yu |
| 9,185,888 B2 | * | 11/2015 | Grajcar ............... F21V 29/58 |
| 2006/0236950 A1 | | 10/2006 | Patrick et al. |
| 2006/0268664 A1 | * | 11/2006 | Lewis ............... A01K 79/02 |
| | | | 367/139 |
| 2013/0174792 A1 | * | 7/2013 | Delabbio ............... A01K 61/00 |
| | | | 119/200 |

OTHER PUBLICATIONS

Allen, G., Amaral, S., and Black, J, "Fish Protection Technologies: The US Experience. Chapter 17. In: S. Rajagopal et al. Eds. Operational and Enviornmental Consequences of Large Industrial Cooling Water Systems," Springer Science+Business, LLC, 2012.

Amaral, S., Taft, N., and Dixon, D., "The Use of Angled Bar Racks and Louvers for Protecting Fish at Water Intakes. A Symposium on Cooling Water Intake Technologies to Protect Aquatic Organisms," 2008.

Haymes, G.T., Patrick, P.H. and Onisto, L.J., "Attraction of Fish to Mercury Vapour Light and Its Application in a Generating Station Forebay," Int. Revue ges. Hydrobiol, 69:867-876, 1984.

Marchesan, M., Spoto, M., Verginella, L. and Ferrero, E.A., "Behavioural Effects of Artificial Light on Fish Species of Commercial Interest," Fisheries Res. 73:171-185, 2005.

Noatch, M.R. and Suski, C.D. Suski, "Non-Physical Barriers to Deter Fish Movements," Environ. Rev. 20:1-12, 2012.

Perry, R.W., Romine, J.G., Adams, N.S., Blake, A.R., Burau, J.R., Johnston, S.V., and Liedtke, T.L., "Using a Non-Physical Behavioural Barrier to Alter Migration Routing of Juvenile Chinook Salmon in the Sacremento-San Joaquin River Delta," River Research and Applications. DOI: 10.1002/rra2628, 2012.

Schilt, C.R., "Developing Fish Passage and Protection at Hydropower Dams," Applied Animal Behaviour Science 104:295-325, 2006.

SeeBrite LED Underwater Lighting-Rev-4.0, Accessed online Sep. 17, 2013.

* cited by examiner

INTEGRATED FISH DIVERSION SYSTEM, AND LIGHTING DEVICE USED THEREIN

FIELD OF THE DISCLOSURE

The present disclosure relates to fish diversion systems and methods, and in particular, to an integrated fish diversion system, and lighting device used therein.

BACKGROUND

Research has been conducted on various fish protection systems in an attempt to reduce both entrainment and impingement at hydroelectric facilities and once-through-cooling thermal power plants. Many of these systems involve elaborate screening systems which are expensive and not always effective, and may be prone to biofouling and debris loading. Lower cost systems such as behavioral barriers employing lights (e.g. strobe or mercury lights) or louvers can be effective for some species, but not others, and thus fail to address differing responses from different fish species.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

There remains a need for a fish diversion system that overcomes some of the drawbacks of known technologies, or at least, provides the public with a useful alternative. Some aspects of the below described embodiments provide such a system.

In accordance with one aspect, there is provided a system for diverting approaching fish from a predominant water flow path and toward a bypass, the system comprising: a structural diversion assembly to be disposed across the predominant water flow path to guide the approaching fish along said structural diversion assembly to the bypass, while allowing passage of water through said structural diversion assembly along the predominant water flow path; one or more lighting devices to be cooperatively disposed in relation to said structural diversion assembly to further guide the approaching fish toward the bypass; and a controller operatively coupleable to said one or more lighting devices and operable to select an output spectrum thereof to optimize fish guidance thereby.

In accordance with one aspect, there is provided a lighting system for triggering different behavioral responses in fish, the system comprising: one or more lighting devices each comprising one or more lighting elements and associated drivers operable to output light having a variable visible output spectrum and a variable output intensity in response to operational parameters communicated thereto, each one of said lighting devices comprising a water submersible housing for housing said one or more lighting elements and associated drivers and for providing a water submersible communication interface; and a control interface operatively coupleable to said water submersible communication interface and operable to receive as input, and communicate said operational parameters to said lighting devices.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

The systems and methods described herein provide, in accordance with different examples, an integrated fish diversion system and method, which in some embodiments, not only provides for greater flexibility and/or lower costs, but also leverages species-specific responses to different stimuli, the plasticity of diel and circadian rhythms in fish, and the influence of various environmental parameters on system performance such as temperature and turbidity in the water column. In some embodiments, the integrated system addresses, at least to some extent, both responses from different species as well as responses from individual species at different life history stages, notably juvenile and adult fish.

In one embodiment, the system combines one or more structural diversion assemblies, such as a bar rack and/or louver array to be disposed across a predominant water flow path, with cooperative lighting, the latter improving upon the performance of the structural assembly(ies) to guide and/or redirect approaching fish toward a bypass. Furthermore, light spectrum selection in line with desired fish behavioral responses may allow, in some embodiments, for an increased spacing between louvers/bars and/or a greater louver/bar array angle to shore, thus reducing the amount of structural materials needed, lowering construction costs and reducing issues common with redirecting structural barriers, such as biofouling and the like.

For example, in one embodiment, the provision of a complimentary lighting system allows the spacing between louvers or bars to be increased from a standard recommended spacing of 2 inches or less, to a spacing ranging from 4 to 16 inches, thus significantly reducing the likelihood of hydraulic head loss issues (e.g. within the context of hydroelectric turbine installations) and biofouling on the bars/louvers, and significantly reducing material and installation costs. Furthermore, the standard recommended angle to flow of no greater than of 30 degrees for bar rack and louver arrays may also be increased in some embodiments, thus further reducing material and installation costs.

As will be discussed below, in one embodiment, system performance may be further improved by increasing slat lengths to a range of 12 to 24 inches, and including a bottom overlay covering, in one example, up to 25% of the louver or bar array height, to further promote diversion of bottom demersal species.

In one embodiment, the fish diverting light system can provide variable frequencies and/or intensities, thus allowing for the dynamic operation of the system to trigger different species-specific responses and/or to adapt to different water conditions. For example, light frequency and intensity levels (i.e. over 1 million available combinations in one embodiment) may be altered via a software-implemented user interface that controls operation of the light diverting system adding flexibility for operation of systems of different sizes as well as adapting for different species of fish, which may, in some installations, migrate in the river or lake of interest over time and exhibit different species-specific responses to stimuli. In one embodiment, the light system may be further adapted to flash at a set or variable frequency (e.g. at or above 1 Hz, namely in a range of between 1 and 40 Hz).

In some embodiments, the system is further adapted for continuous or regular monitoring of water conditions, such as temperature and turbidity, allowing for light conditions to be adapted dynamically (e.g. light frequency and/or intensity) as a function of such conditions to maximize fish diversion efficiency.

In one embodiment, the diverting light system may comprise as few as 5 LEDs or less to produce a focused beam that guides fish along the diverting louver or bar rack array.

Figure 1:
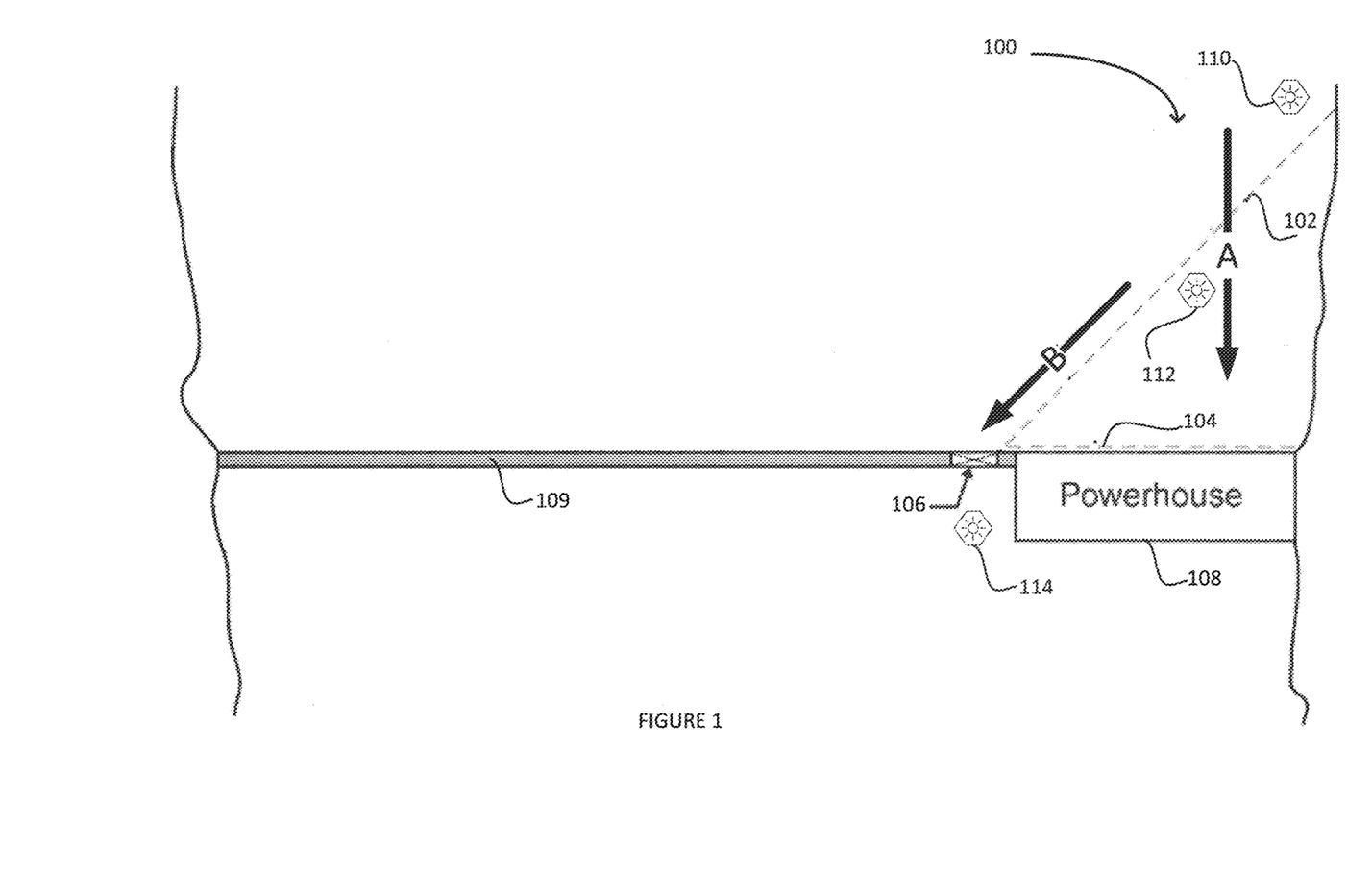
FIG. 1 is a schematic diagram of an integrated fish diversion system, in accordance with one embodiment.

With reference now to FIG. 1, and in accordance with one embodiment, an integrated fish diversion system, generally referred to using the numeral 100, will now be described. The system 100 generally comprises one or more structural diversion assemblies, such as angled and perpendicular assemblies 102 and 104, respectively, disposed across a predominant water flow path (designated by arrow A) to guide or redirect approaching fish toward a downstream bypass 106 (e.g. along a redirection path designated by arrow B), and thus divert the approaching fish away from an otherwise undesirable path (e.g. leading to powerhouse 108 in this example) while allowing them safe passage to their destination (e.g. beyond spillway 109). The system 100 further comprises one or more luminous diversion devices, such as lighting devices 110 and 112, to guide approaching fish, in this example, toward and along the angled structural diversion assembly 102. A further lighting device 114 is also provided in this example to guide approaching fish through the downstream bypass 106.

In this example, the angled assembly 102 comprises an array of angled slats oriented so to promote fish guidance along the array, the array itself illustratively disposed at a 45 degree angle relative to the shoreline (and thus equally oriented at a 45 degree angle relative to the predominant water flow in this example). As noted above, given the cooperative effects provided by the embodiments described herein, an angle to flow may be increased from the maximum recommended angle of 30 degrees, to an angle of 30, 45, 60, 75 or even approaching 90 degrees, for example. When operated in a reverse mode, an angle to flow may thus approach 175 degrees, for example.

Figure 3:
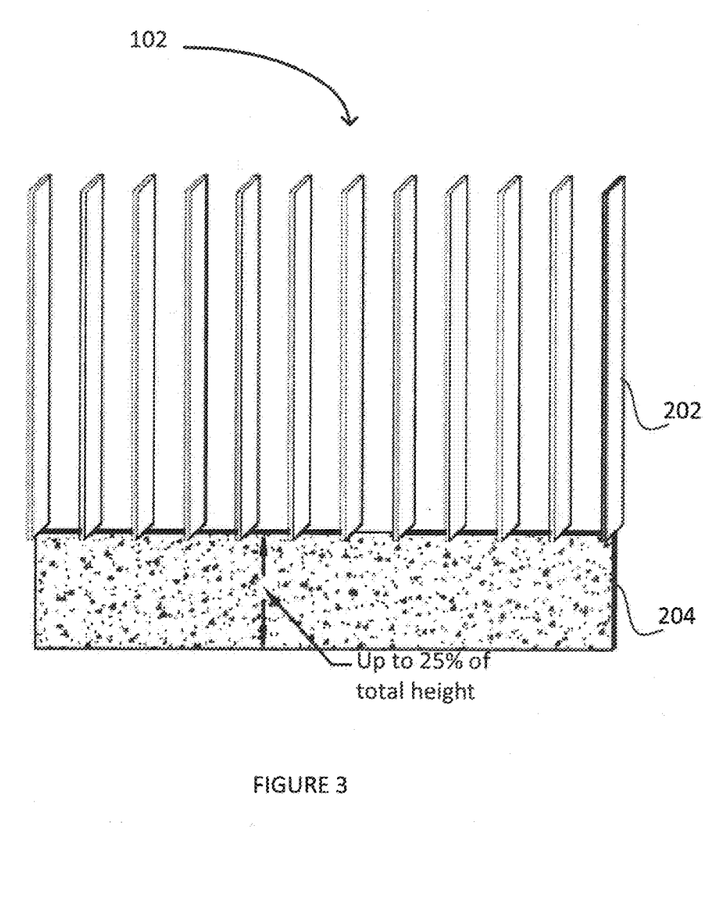
FIG. 3 is a front schematic view of the louvered array of FIG. 2, further showing a bottom overlay thereof, in accordance with one embodiment.

The reversed bar rack or louver assembly 102 can be designed to serve a dual role: protect downstream equipment (e.g. turbine protection in the context of a hydroelectric dam) by diverting debris, as well as fish protection and diversion towards the downstream bypass 106. Another function of the assembly 102 where additional screening systems are used to protect downstream equipment may be to divert or minimize debris so that less material ends up on the screens, thus reducing screen cleaning requirements and challenges. That being said, assembly design may include specific features selected so to increase or maximize fish diversion, such as frame angle, slat angle, slat length, slat spacing, and in some embodiments such as shown in FIG. 3, a bottom overlay. For example, in some embodiments, a primary function of the structural assembly 102 is to divert juvenile and adult fish which may eventually become entrained through the turbines or impinged on the bar racks (or screens). Fish avoidance responses may also be expected from large schools encountering these assemblies since the entire school would respond as a single unit, and would be too large to pass through the assembly slat openings, particularly when used in a reversed mode. In addition, avoidance behavior of individual fish may also be expected based on the slat length which can be selected to create a "space perception" cue, whereby certain species of fish have been shown to avoid close openings based on space perception and visual cues.

Figure 2:
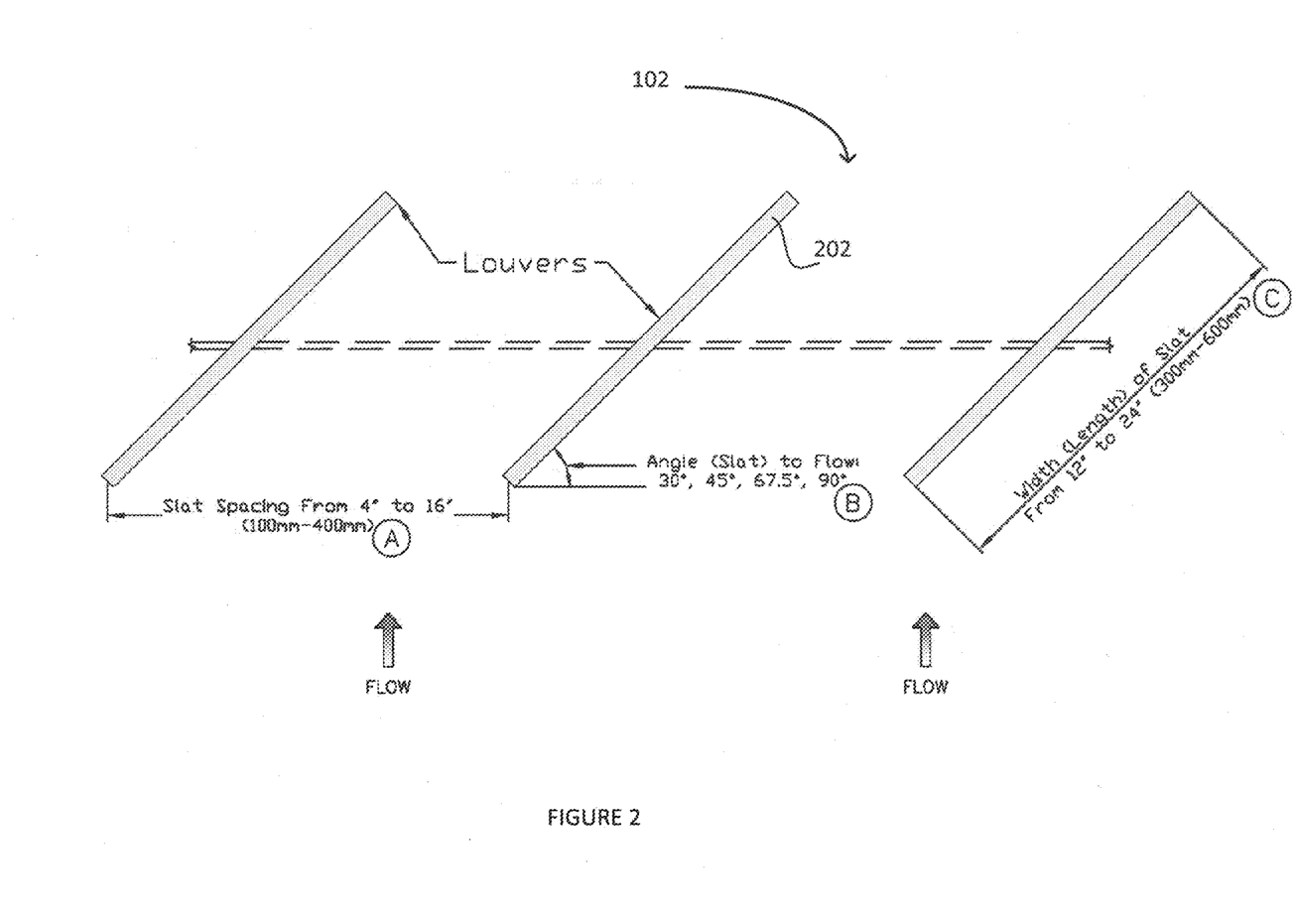
FIG. 2 is a top schematic view of a louvered array for use in the context of the system of FIG. 1, and showing different structural parameters thereof in accordance with different embodiments.

FIG. 2 provides an example of an angled slat array 102, oriented in FIG. 1 as a reversed louver array or modified angled bar rack disposed at an angle to the shoreline. In the example of FIG. 2, the louvered array 102 is shown to include a spacing between slats 202 of between four (4) and sixteen (16) inches, a slat angle to flow selected from 30, 45, 67.5 and 90 degrees (depending both on an angle of the slats relative to the array and an angle of the array relative to the shoreline/predominant water flow), and a slat width (or length) ranging from twelve (12) inches to twenty-four (24) inches.

The louver or angled bar rack assemblies considered in these examples consist of evenly spaced, vertical slats (i.e., louvers) disposed and aligned across a predominant flow path, traditionally at an array angle to flow of between 15 and 35 degrees, but optionally disposed at higher angles in the present context given the cooperative luminous diversion mechanisms discussed herein. In some embodiments, the louver slats may be angled at 90 degrees to the predominant flow (though other angles may also be considered as noted above), thus generating flow turbulence that fish tend to avoid and effectively guiding fish to the bypass 106.

With added reference to FIG. 3, a solid bottom overlay 204 may also be provided, in this example extending up to 25% of the total height of the angled louver assembly 102, to effectively divert fish along the bottom of the louver array 102. In particular, this bottom overlay 204 may provide for improved diversion of bottom dwelling species.

The perpendicular assembly 104, in the example of FIG. 1, consists of a traditional bar rack which is angled 90 degrees to the flow and provides a secondary diversion mechanism should the initial assembly 102 and cooperative lighting system fail to effectively divert certain fish toward the bypass 106. One or more screens (i.e. moving screens, static screens, drum screens, etc.) may also be used to provide for further fish diversion and/or protection for downstream components/equipment.

As noted above, the lighting devices 110, 112 and 114 are used as an attractant both along the angled structural diverting assembly 102 to orient and guide approaching fish along the assembly 102, and at the bypass 106 to encourage fish passage therethrough. As noted above, using the cooperative lighting system, effective fish guidance is achieved along the assembly 102 even with increased slat spacing and assembly angle to shore.

In one embodiment, the lighting devices 110, 112 and 114 make use of LED technology to provide a wide range of light spectra, namely by combining LEDs of different colors (e.g. red, green and blue) to produce designated output spectra previously observed to act as a strong attractant (or repellant) stimulus for fish species of interest, for example. For example, some fish species are attracted or repelled by light in the red spectrum, whereas others are attracted to light in the blue-green region of the visible light spectrum. These behavioral responses can also vary diurnally as well as seasonally with fish ontogenetic stage development. The lighting devices considered herein are thus operable to produce different output spectra depending on the fish species of interest, time of day, time of year, etc.

Figure 4:
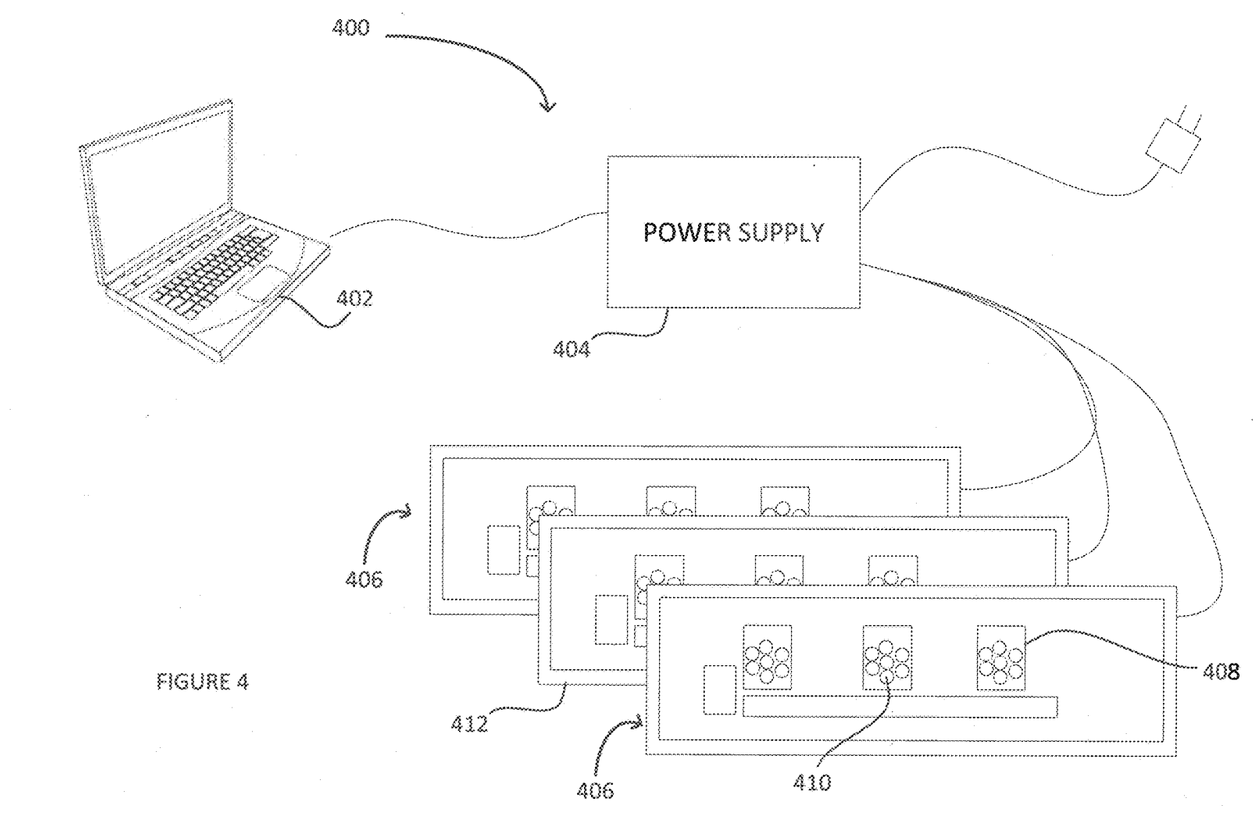
FIG. 4 is a schematic diagram of a lighting system having multiple lighting devices for use within the context of the fish diversion system of FIG. 1, in accordance with one embodiment.

With reference to FIG. 4, and in accordance with one embodiment, a lighting system 400 usable within the context of the fish diversion system of FIG. 1, will now be described. The system 400 generally comprises a base station 402, such as a central or networked computing system, controller or the like, a power supply 404 operatively coupled thereto to receive therefrom operating instructions (e.g. a 24 VDC power supply operatively coupled to the base station 402 via an RS485 cable or the like, and itself powered via a standard connection to 120 VAC mains), and one or more lighting devices 406, such as those illustratively shown as lighting devices 110, 112 and 114 in FIG. 1, powered and controlled via the power supply 404 and base station 402 (e.g. via an RS485 interface).

Each lighting device 406 generally comprises one or more variable LED light modules, in this example comprising three (3) red, green and blue LED light modules 408, to provide a wide range of frequency and intensity combinations to either attract or repel fish. In one example, each LED module 408 provides over 1300 lumens of light and is controlled by an onboard micro-processor (not explicitly shown) which communicates with the central base station 402 allowing a user to control the device and view device information (see FIGS. 5 and 6 discussed below, for example). In this particular example, each LED light engine 410 can produce up to 16 million saturated and blended colors (including white with variable color temperature) from a single point source. These engines are configured within a single cavity populated with multiple LEDs to deliver maximum usable light. The micro-processor receives, decodes and performs the commands sent from the base station 402 to the LED modules 408, in this example via an RS485 cable and interface operatively coupled between the power supply 404 and water submersible housing 412 of each lighting device 406.

In one example, LED drive modules include constant current drivers that allow independent control of each individual red, green and blue LED on each light engine, thus allowing for control on the output intensity and spectrum of each LED light module 408, and ultimately of each combined lighting device 406. The RS485 module in this example provides the communications interface between the lighting devices 406 and the base station 402. A surface enclosure contains the 24 VDC power supply 404 for the unit that connects to the AC (120 VAC) mains, as well as provides the connection to the underwater lighting devices 406.

In one embodiment, each lighting device 406 is adapted to produce visible light wavelengths between about 400 and about 700 nm, and intensities between about 0.1 lux to over 1000 lux when measured at 1 meter from the light source in air.

In one embodiment, each lighting device 406 may further be equipped and/or associated with one or more environmental sensors (not shown), such as for example a water temperature sensor, a water turbidity sensor, and the like. Data signals acquired via these sensors may be communicated back to the base station 402 for processing, for example in adjusting optical output controls such as intensity and/or spectrum to account for varying ambient conditions.

Figure 5:
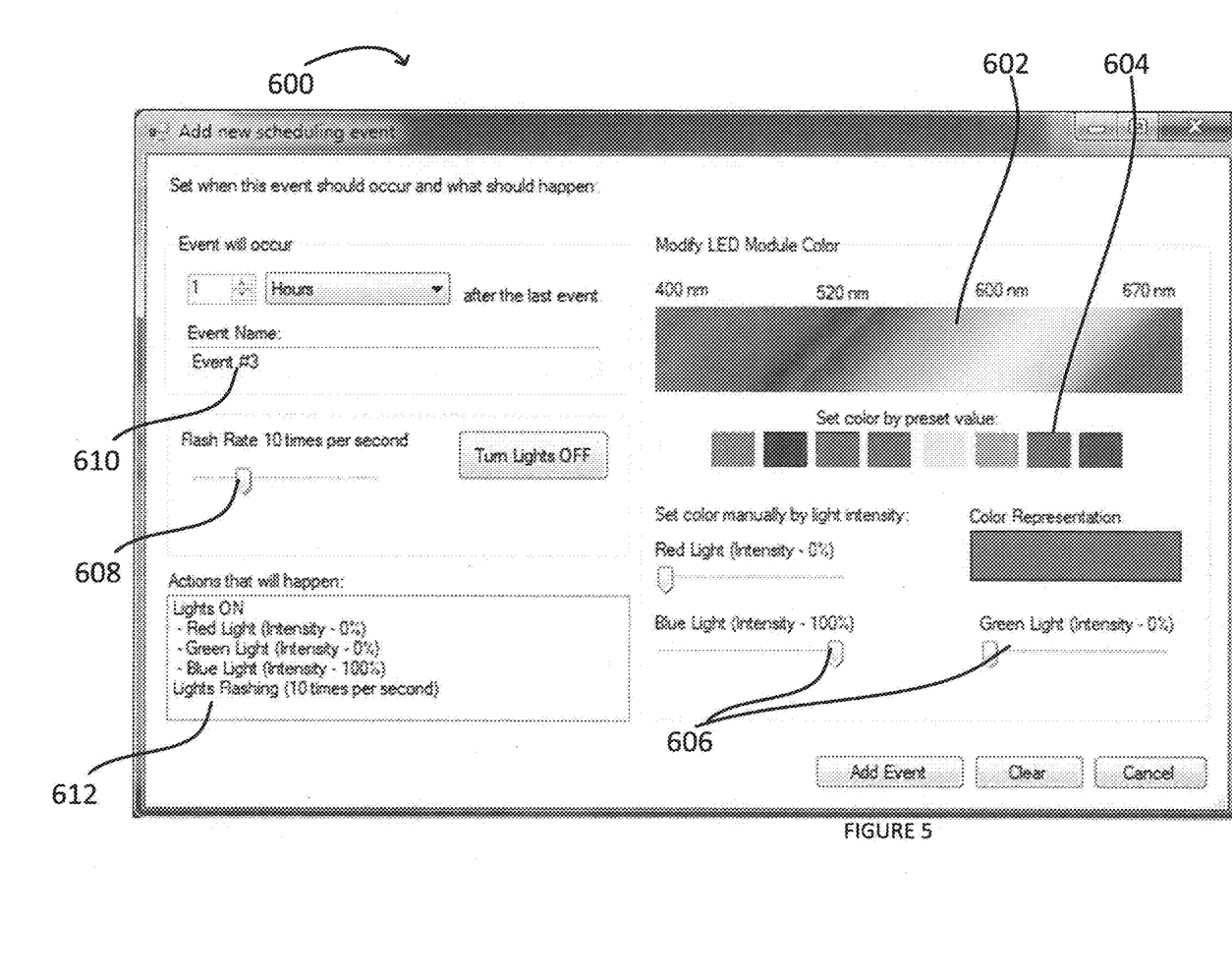
FIG. 5 is an illustrative screenshot of a computer-implemented user interface for setting and adjusting events for the variable operation of a lighting device to be used in a fish diversion system, in accordance with one embodiment.

With reference now to FIG. 5, and in accordance with one embodiment, a user interface to the lighting system 400, such as a computer and/or software-implemented graphical user interface (GUI) 600, is provided to control, adjust and/or schedule operation of the lighting system 400 based on different operational parameters. In one embodiment, the GUI 600 may be graphically rendered on a display (e.g. a dedicated or associated screen such as commonly associated with a computing device) by a series of computer-readable statements and instructions stored on a computer-readable medium (e.g. local, networked and/or remote data storage device or medium) and implemented by one or more processors (e.g. one or more local, networked and/or remote data processors). Exemplary devices usable in the processing and rendering of the GUI 600 may include, but are not limited to, general purpose computers, laptops, smartphones and the like operationally configured to implement a designated application software for the purpose of rendering the GUI 600 and communicating control parameters and data with the lighting device, or a dedicated computing device, such as a local or remote terminal, or the like, specifically programmed for this purpose. Other such examples will be readily apparent to the person of ordinary skill in the art, and are therefore intended to fall within the general scope of the present disclosure.

In one example, the user interface 600 may be used to adjust or configure the output spectrum and/or intensity of the system's lighting devices (e.g. via interactive color spectrum 602, palette 604 and/or manual RGB sliders 606) depending on various parameters such as season, time of day, duration of and level of illumination required, turbidity level, temperature, knowledge of fish species present and/or expected, their reproductive state and ontogenetic stage development, to name a few. Namely, each one of these variables may potentially influence the effectiveness of the system in guiding approaching fish toward the system bypass, that is, by affecting a fish's response to the system, be it operated as a repellant for regions to be avoided by the fish, or as an attractant for regions of interest such as guiding assemblies disposed to guide fish toward the system bypass, and the bypass itself. A flash rate of the lighting devices 406 may also be initiated and/or adjusted (e.g. via interactive slider 608), for example within a range of 0 to 40 flashes/sec, and that is, for any selected output spectrum and/or intensity combination.

As shown in FIG. 5, the scheduling user interface 600 can be used to automate spectral and intensity changes, amongst other parameters, to be applied to the lighting devices over time. For example, one or more luminous output scheduling tasks/event (e.g. see Event Name box 610) may be set and implemented over time (e.g. every hour, day, etc., or gradually over multiple weeks, months and/or through different seasons) on a routine basis, thus allowing the system to automatically execute output color and intensity changes as needed or appropriate given predicted environmental and/or fish population conditions. For example, the lights may be turned on or off at specific times such as during the day and night to account for diurnal activity in fish. In another example, a spectral output of some or all the lights may be adjusted as a function of time of day (e.g. differing spectra for night and day operation). In yet another example, a spectral output of some or all the lights may be adjusted as a function of the season (e.g. differing spectra for young fish in the Spring and mature fish in the Fall). In yet another example, all the lights may be operated at a given output intensity during the day, while different lights may be operated at different intensities at night. Other such examples may be implemented within this context, as will be apparent to the skilled artisan, without departing from the general scope and nature of the present disclosure.

Furthermore, multiple actions can be performed per task (e.g. see event summary box 612), for example, setting the LED color intensity and flash rate as one task, setting a particular spectral output and intensity as another task, and the like. In addition, scheduling templates may be saved in memory at the control station, for example, allowing schedules to be built from a template—thus enabling reuse of common tasks and saving time.

Figure 6:
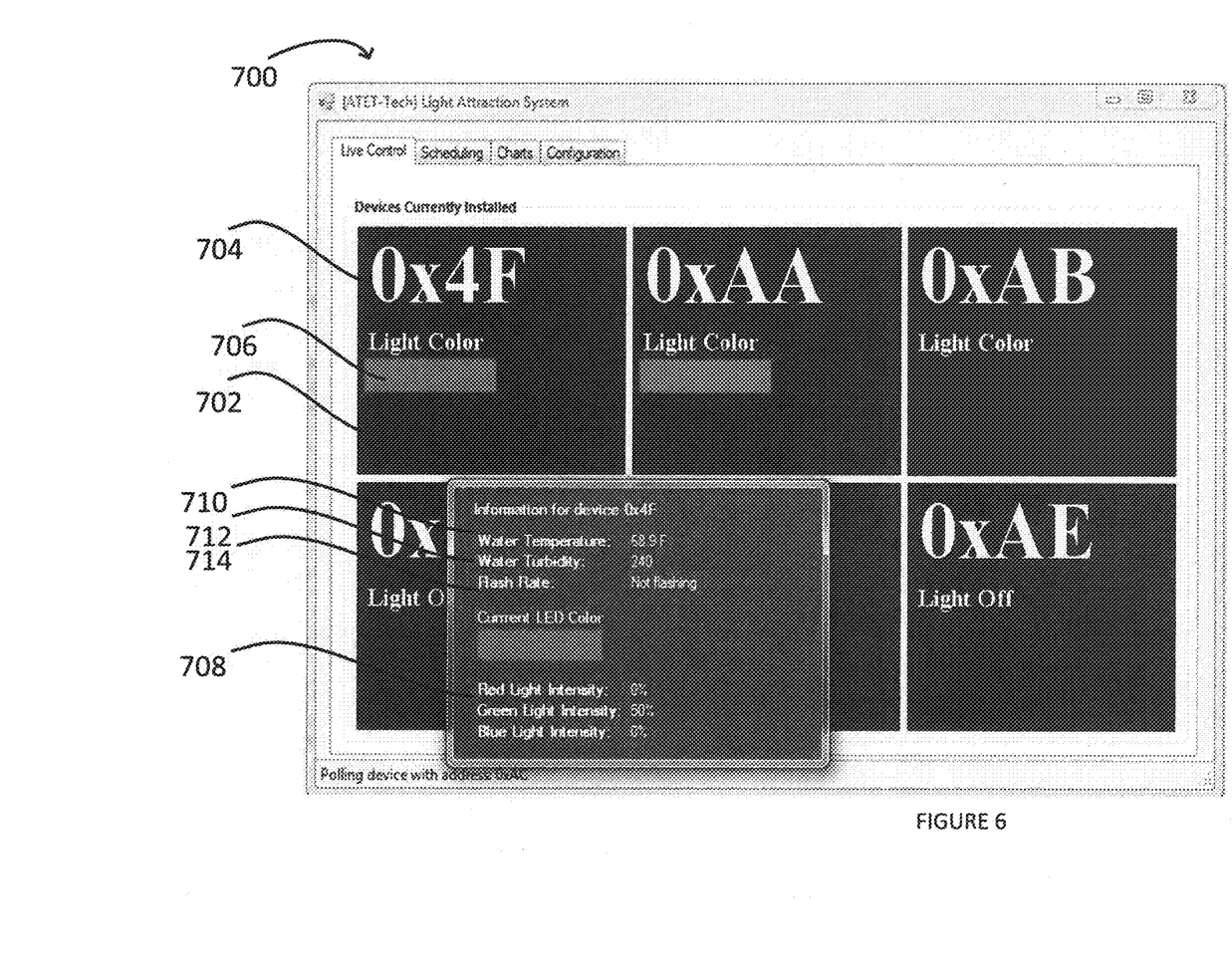
FIG. 6 is an illustrative screenshot of a computer-implemented user interface for accessing current operating conditions and parameters of different lighting devices used in a fish diversion system, in accordance with one embodiment.

Furthermore, and as noted above, the interface may be configured to interface with multiple lighting devices, for example disposed at different locations or for different purposes in the overall diversion system 100. Accordingly, different lighting devices may be operated at a same output spectrum but at different intensities, or again, at different output spectra and at a same intensity. For example, output intensity may be increased as one approaches the bypass, while maintaining a same attractant output spectrum along the entirety of the diversion system 100. This may be particularly useful for large scale diversion systems whereby fish are guided over longer distances. Similarly, a same system may be operated in different contexts where different intensity outputs may come with different advantages. For example, the use of more low output intensity units may provide greater illumination coverage, which may be beneficial in the context of diversion systems at power plants, for example, and to improve commercial catch of fishes, in an alternative application to the herein described lighting devices.

Where multiple devices are used, an interface 700 as shown in FIG. 6 may be provided to give a user access to current operating parameters and conditions for each device (e.g. via respective interface windows or frames 702), such as a lighting device identifier 704, an output color 706 and/or spectral distribution 708 (e.g. % red, green and blue), local water temperature 710 and turbidity 712 (e.g. in a vicinity of the lighting device), current flash rate 714, and the like.

As noted above, both temperature (degrees C. or F) and turbidity (FTU) sensors may also be incorporated in the design of, or associated with, the lighting devices such that data representative of these environmental conditions (e.g. water temperature and turbidity values ranging from 0 to 750 FTU, or related values on the NTU scale) may be collected at regular intervals (e.g. hourly, every few minutes or continuously in real-time).

In one embodiment, environmental data can therefore be plotted on a regular basis using the system interface (e.g. daily, weekly, monthly and/or annually) to allow for adjustments to output light intensity and/or spectrum as appropriate, or again to be charted, stored and/or statistically analyzed downstream. For example, at high turbidity levels, light penetration of the lighting system would be expected to be poor, and increased intensities may thus be applied. These environmental adjustments may either be implemented manually upon consideration of plotted data (e.g. manually adjust lighting parameters for different time periods, seasons and/or currently observed conditions), or automatically in response to unexpected or continuously tracked environmental conditions.

While the lighting system is described herein within the context of fish diversion, particularly in combination with one or more structural diversion assemblies, the lighting system may also or alternatively be used to study and provoke desired fish responses to different lighting spectra. For example, underwater lighting using the device described herein could be used to reduce stress in fish aquaculture, or again used for commercial fishing applications (e.g. as an attractant/repellant for guiding certain desired fish species toward fish capturing devices, and/or as an attractant/repellant for guiding unwanted fish species away from such devices). As noted above, this flexibility allows for greater control over species-specific responses to both frequency and intensity of light, the plasticity of diel and circadian rhythms in fish, and the influence of various environmental parameters on light penetration in the water column such as turbidity.

In one embodiment, the lighting system described herein may be further configured to operate with a standard or dedicated commercial "fish finder" which potentially can be used to qualitatively assess fish activity (e.g. as a gross estimate of fish density). This feature can thus allow for adjustments to output intensity and/or spectrum based on these results, and thus seek to improve the fish behavioral response to these outputs.

Results

Reference will now be made to the following example in which preliminary experimental results acquired using an experimental embodiment of an integrated fish diversion system as disclosed herein will be presented.

In this example, experiments were conducted in a designated enclosure in the littoral zone of a small freshwater lake. Experiments focused on juvenile Rock Bass (*Ambloplites rupestris*) that were collected from the lake using standard fishing techniques. The methodology included sectioning off zones from the light source where behavioral observations (in seclusion) could be made at 1-meter intervals from 0 to 6 meters on the responses of Rock Bass to different frequencies and flash rates of the lighting system. All zones are marked as one-meter distances from the lighting device with the exception of Zone 6 as the outer zone. Zone 1 is the closest zone to the light, while Zone 6 is the farthest. All experiments were conducted during the day where light levels were minimal. Different fish were used for each experiment.

Distance from Continuous Light Source

Figure 7:
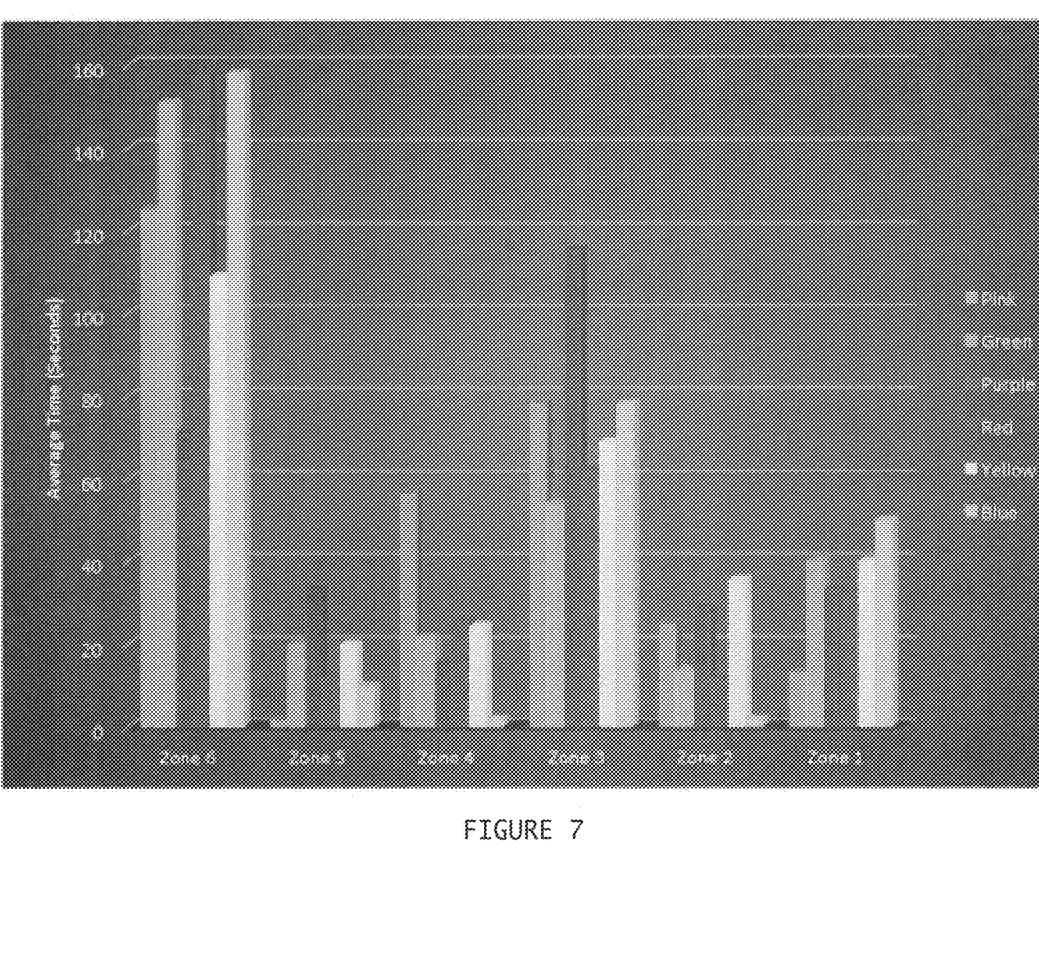
FIG. 7 is a plot of the average time (seconds) in which Rock Bass situate at a defined distance relative to a continuous light source for different output colors.
Figure 8:
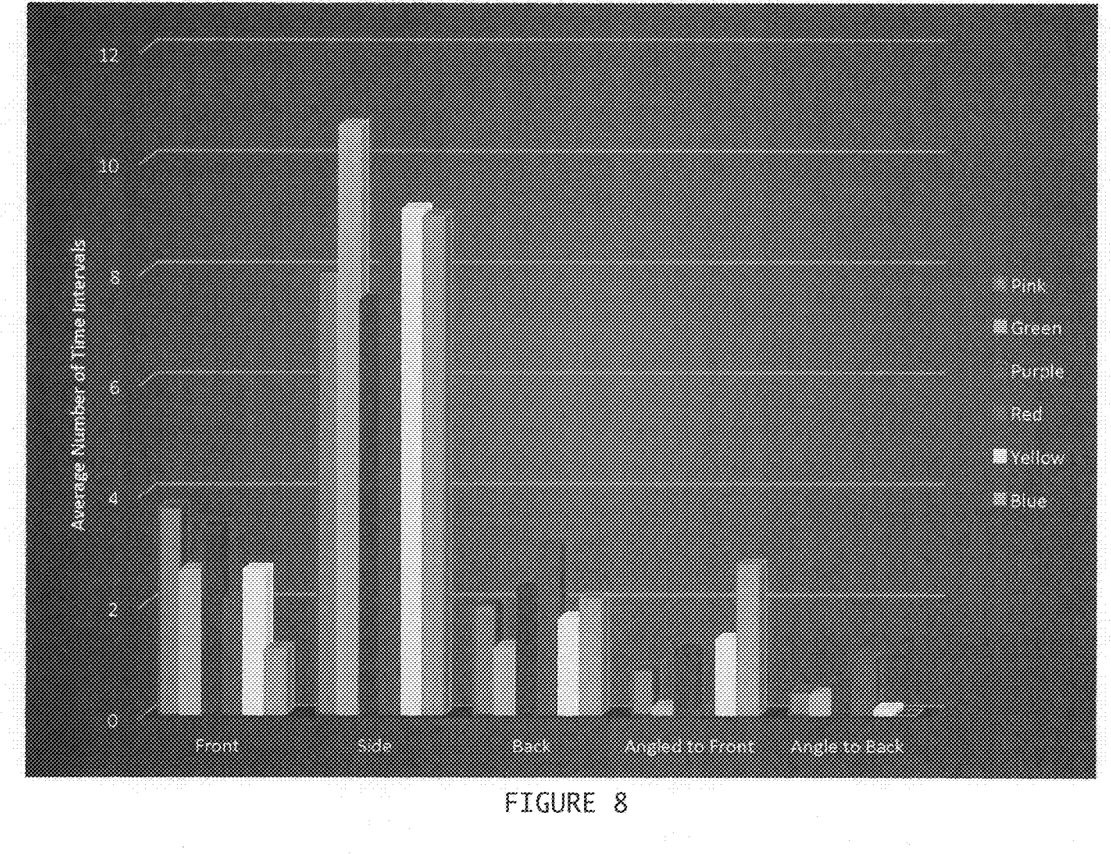
FIG. 8 is a plot of the average number of 20-second time intervals in which a selected orientation is displayed by Rock Bass exposed to a continuous light source of different output colors.

With reference to FIG. 7, and in accordance with one example, experimental results using a continuous light source in different colors show that Rock Bass tend to situate themselves primarily in Zone 3 and Zone 6 based on time, where Zone 6 is seen as a maximum deterrent zone in regards to overall distance from the light, while Zone 3 is considered a neutral zone, being situated in the middle of the arena. As shown in FIG. 8, the solid colors of pink, blue, green, yellow and red appear to have been the most effective at keeping the Rock Bass in Zone 6, while the solid color of purple appears to have been the least effective with a somewhat higher average time being spend in Zone 3.

Orientation to Light Source

With reference to FIG. 8, and in accordance with one example, experimental results using a continuous light source in different colors provide an overview of the average number of time intervals for which each of a number of discernable fish orientations was displayed for solid coloration. This data was collected in 20-second periods over a 5-minute trial time. Each orientation was noted as a defined angle relative to the lighting system, categorized as 0° for frontwards, 180° for backwards, 45° for angled to the front and 135° for angled to the back. It can be noted that the sideways orientation was exhibited to the greatest extent for all solid colors in comparison to other orientation types. Frontwards and backwards orientation followed that of sideways to a lesser extent for all coloration except blue and angled to the front or back were seen as the least common orientation positions. These results support the expectation that when lights are combined with a louver array with a sweeping current, fish that display a sideways orientation will be more easily redirected along a diversion path of to a bypass.

Effect of Low Flash Rate on Fish Behavior

Figure 9:
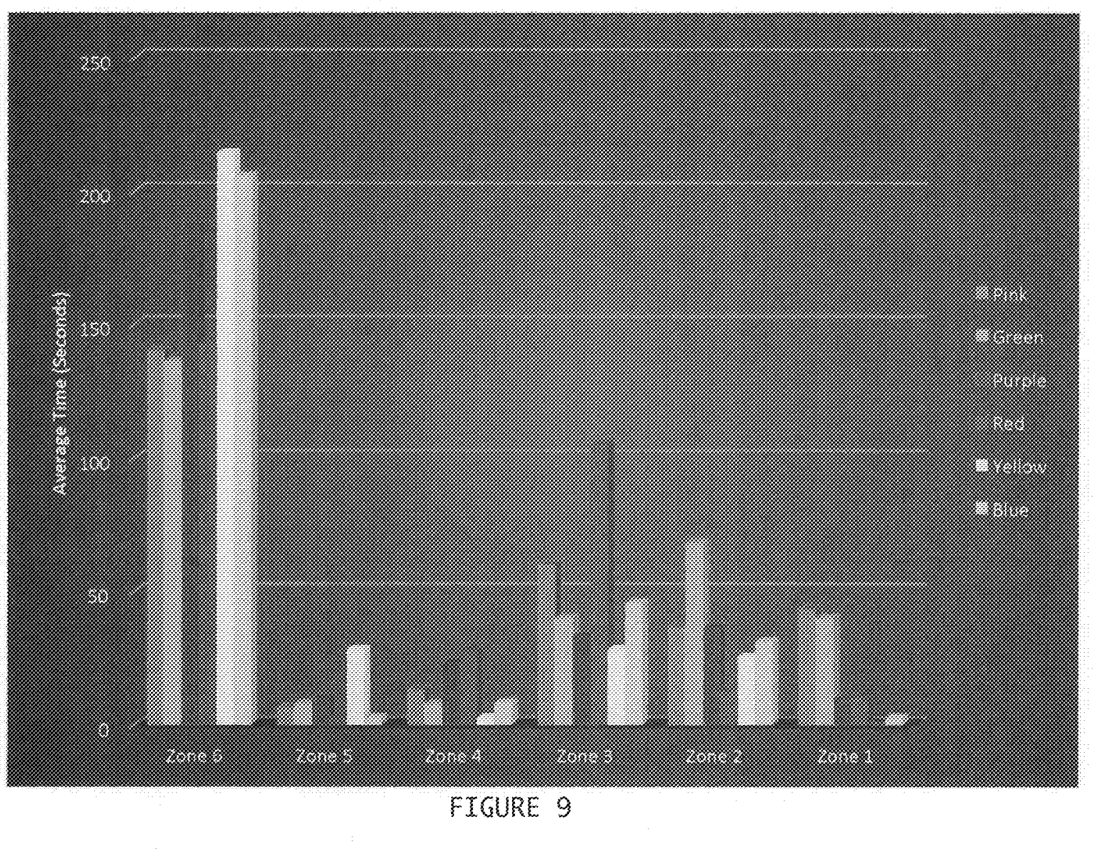
FIG. 9 is a plot of the average time (seconds) in which Rock Bass situate at a defined distance relative to a flashing light source operating at a low flash rate (120/min) for different output colors.

With reference to FIG. 9, and in accordance with another example, experimental results using a light source with a low flash rate are presented. In this example, a low flash rate of 120/min was used for different colors, and the average amount of time (in seconds) that Rock Bass situate at a specified distance from the lighting device light for each color was noted. As can be seen from these results, Zone 6 was the most common distance for the Rock Bass, and that for all colors. This zone is considered the deterrent zone, being the farthest from the lighting device. Use of a low flash rate also appears to promote greater deterrence, as observed by comparing results shown in FIGS. 8 and 10.

While the above results focus on the effectiveness of light sources of different colors or output spectra alone on fish deterrence and orientation, it will be appreciated that the combination of these adjustable light sources with various structural barriers/guides in establishing an integrated fish guidance system can be used to positive effect in enhancing the performance of the overall system so integrated. For example, these results support the position that combination of adjustable light sources with a reversed louver system, for example, may increase effectiveness in diverting fish toward a diversion path, namely by encouraging not only fish avoidance of certain areas but also promoting certain fish orientations conducive to promoting adherence to a predefined fish diversion path.

It will also be appreciated from the preliminary results included herein that the use of different output light colors may be used to different effect, namely in further promoting fish diversion, avoidance, and/or orientation based on a particular fish diversion system configuration.

While the present disclosure describes various exemplary embodiments, the disclosure is not so limited. To the contrary, the disclosure is intended to cover various modifications and equivalent arrangements included within the general scope of the present disclosure.

What is claimed is:

1. A lighting system for triggering different behavioral responses in fish, the system comprising:
    one or more lighting devices each comprising one or more lighting elements and associated drivers operable to output light having a variable visible output spectrum and a variable output intensity in response to operational parameters communicated thereto;
    said operation parameters being provided so as to selectively influence said behavioral responses of one more species of fish within a given environment;
    each one of said lighting devices comprising a water submersible housing for housing said one or more lighting elements and associated drivers and for providing a water submersible communication interface; and
    a control interface operatively coupleable to said water submersible communication interface and operable to receive as input, and communicate said operational parameters to said lighting devices.

2. The lighting system of claim 1, wherein said lighting elements comprise LEDs.

3. The lighting system of claim 1, further comprising a computer-implementable graphical user interface (GUI) for setting said operational parameters and communicating same via said control interface, wherein said GUI comprises a scheduling interface for scheduling designated changes to said operational parameters over time.

4. The lighting system of claim 1, said control interface further operatively coupleable to one or more environmental sensors integrated or associated with each of said lighting devices to receive one or more of water temperature and water turbidity readings therefrom, and further operable to automatically adjust said operational parameters as a function of said readings.

5. The lighting system of claim 1, wherein said one or more lighting devices comprise two or more lighting devices, and wherein said control interface is operable to select, for at least two of said two or more lighting devices, at least one of distinct output spectra and distinct output intensities.

6. The lighting system of claim 1, further comprising a water monitor for monitoring one or more of water temperature and turbidity, said control interface further operable to adjust an intensity of said one or more lighting devices as a function of one or more of said water temperature and turbidity.

7. The lighting system of claim 1, wherein said control interface is further programmable to automatically select at least one of different output spectra and output intensities over time as a function of a designated schedule.

8. The lighting system of claim 7, wherein said designated schedule is designated as a function of one or more of a time of day, a season and known species-dependent responses for species anticipated to approach the system in different time periods.

9. The lighting system of claim 1, wherein said behavioural response is a phototactic response.

* * * * *